United States Patent
Kho

(10) Patent No.: US 11,288,610 B2
(45) Date of Patent: Mar. 29, 2022

(54) METHOD FOR MANAGING SEQUENTIAL PROCESSES BY USING SPREADSHEET-TYPE PROCESS DATA, PROCESS MANAGING SERVER AND SPECIFIC WORKER'S TERMINAL USING THE SAME

(71) Applicant: Matt J S. Kho, Hwaseong-si (KR)

(72) Inventor: Matt J S. Kho, Hwaseong-si (KR)

(*) Notice: Subject to any disclaimer, the term of this patent is extended or adjusted under 35 U.S.C. 154(b) by 29 days.

(21) Appl. No.: 16/855,208

(22) Filed: Apr. 22, 2020

(65) Prior Publication Data

US 2020/0342383 A1    Oct. 29, 2020

(30) Foreign Application Priority Data

Apr. 23, 2019    (KR) .................. 10-2019-0047588

(51) Int. Cl.
*G06Q 10/06*        (2012.01)
*G06F 16/93*        (2019.01)
(Continued)

(52) U.S. Cl.
CPC ....... *G06Q 10/06316* (2013.01); *G06F 16/93* (2019.01); *G06F 40/18* (2020.01);
(Continued)

(58) Field of Classification Search
CPC ..... G06Q 10/06316; G06Q 10/063114; G06Q 10/0875; G06Q 10/10; G06Q 10/0635; G06Q 50/04; G06F 16/93; G06F 40/18
(Continued)

(56) References Cited

U.S. PATENT DOCUMENTS

2002/0103690 A1* 8/2002 Lyon ................ G06Q 10/06314
                                                    705/7.12
2005/0246240 A1* 11/2005 Padilla .................. G06Q 10/06
                                                    705/26.3
(Continued)

FOREIGN PATENT DOCUMENTS

JP          2015-225440 A     12/2015
KR          2002-0034247 A     5/2002
(Continued)

OTHER PUBLICATIONS

Michael et al "Lightweight Process Support with Spreadsheet-Driven Processes: A Case Study in the Finance Domain", Jan. 2018, International Conference on Business Process Management BPM 2017: Business Process Management Workshops, pp. 323-334. (Year: 2018).*

*Primary Examiner* — Romain Jeanty
(74) *Attorney, Agent, or Firm* — Taft Stettinius & Hollister LLP; Ryan O. White; Derek B. Lavender

(57) ABSTRACT

A method for managing processes by using spreadsheet-type data is provided. The method includes steps of: a process managing server (a) if spreadsheet-type data including a list of product orders, its corresponding information on sequential processes are acquired, assigning priorities to the individual product orders and creating a process table; and (b) (i) transmitting the process table to a manager's and workers' terminals, (ii) changing, if information on selecting a specific product order is acquired from the manager's terminal, the color of a specific process area to be a first color, (iii) changing, if information on selecting the specific process area is acquired from a terminal of a specific worker, the color of the specific process area to a second one, and (iv) changing, if information on selecting the specific process
(Continued)

area is acquired from the specific worker's terminal, the color of the specific process area to a third one.

26 Claims, 3 Drawing Sheets

(51) Int. Cl.
*G06F 40/18* (2020.01)
*G06Q 10/08* (2012.01)
*G06Q 10/10* (2012.01)
*G06Q 30/06* (2012.01)
*G06Q 50/04* (2012.01)

(52) U.S. Cl.
CPC . *G06Q 10/063114* (2013.01); *G06Q 10/0875* (2013.01); *G06Q 10/10* (2013.01); *G06Q 30/0635* (2013.01); *G06Q 50/04* (2013.01)

(58) Field of Classification Search
USPC .......................................................... 705/7.15
See application file for complete search history.

(56) References Cited

U.S. PATENT DOCUMENTS

| | | | |
|---|---|---|---|
| 2006/0195494 A1* | 8/2006 | Dietrich | G06Q 10/10 708/110 |
| 2007/0033080 A1* | 2/2007 | Hochberg | G06Q 10/06 705/80 |
| 2020/0012759 A1* | 1/2020 | Saruyama | G06Q 10/087 |

FOREIGN PATENT DOCUMENTS

| | | |
|---|---|---|
| KR | 10-2009-0000285 A | 1/2009 |
| KR | 10-2012-0135962 A | 12/2012 |

\* cited by examiner

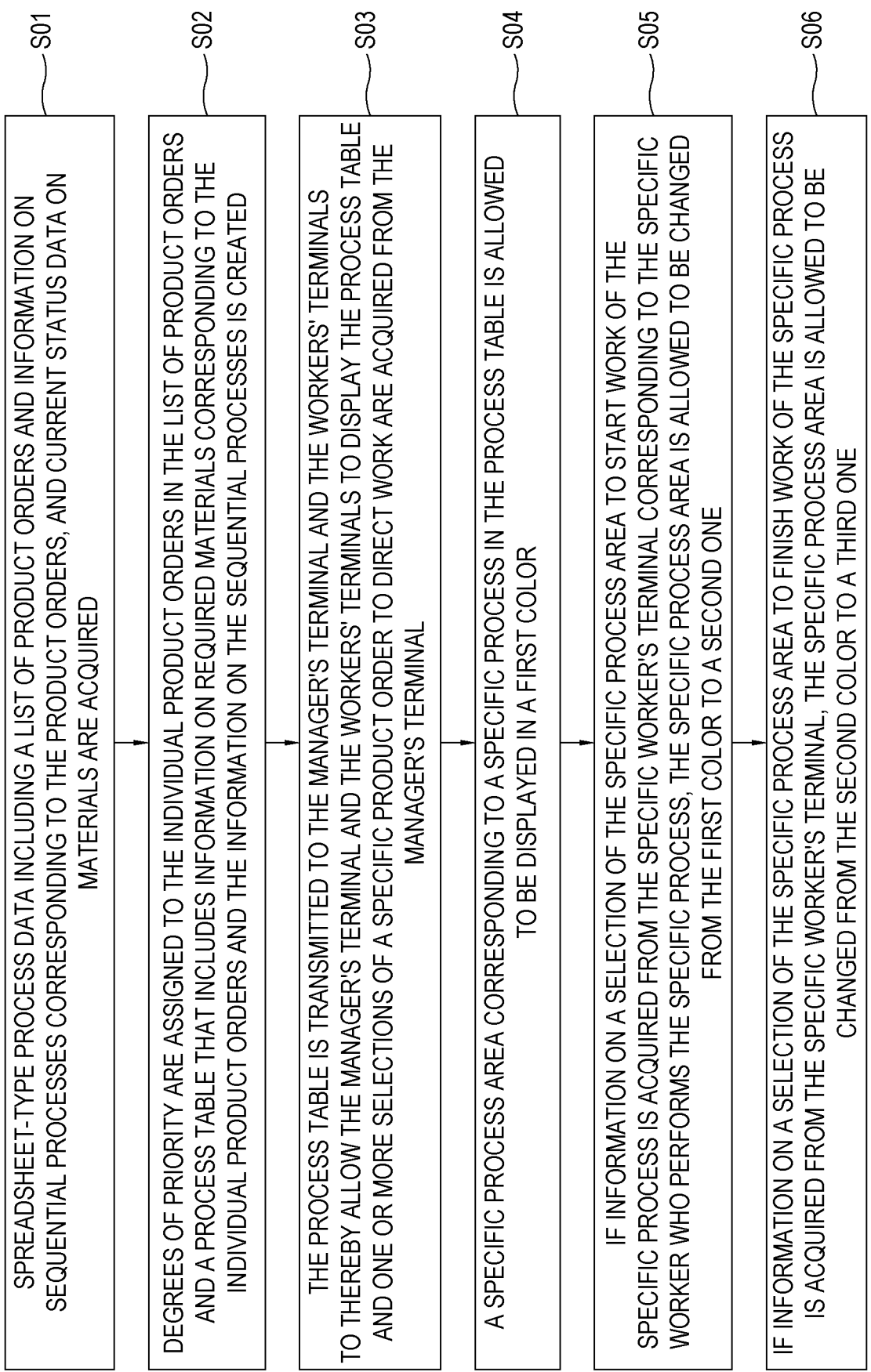

FIG. 3

| NO. | THE DATE TO BE RELEASED | CUSTOMER | ORDER NO. (P O N S) | SIZE | RATING | VALVE TYPE | TRIES NO. (PART NO.) | MATERIAL BODY | MATERIAL DISC | MATERIAL STEM | Q'TY | TURNING MATERIAL COMMITMENT | TURNING WORKER | TURNING END | BORING MATERIAL COMMITMENT | BORING WORKER | BORING END | DRILLING MATERIAL COMMITMENT | DRILLING WORKER | DRILLING END | ... | ... |
|---|---|---|---|---|---|---|---|---|---|---|---|---|---|---|---|---|---|---|---|---|---|---|
| 107 | 01-30 | ABZ | #13374 | 2" | CL. 150 | WAFER | 401-100 | WCB | CF8M | 17-4PH | 10 | | | | | | | | | | ... | ... |
| 108 | 01-30 | ABZ | #13374 | 2" | CL. 150 | WAFER | 401-100 | WCB | CF8M | 17-4PH | 10 | | | | | | | | | | ... | ... |
| 109 | 01-30 | ABZ | #13374 | 2" | CL. 150 | WAFER | 401-100 | WCB | CF8M | 17-4PH | 10 | | | | | | | | | | ... | ... |
| 110 | 01-30 | ABZ | #13374 | 2" | CL. 150 | WAFER | 401-100 | WCB | CF8M | 17-4PH | 10 | | | | | | | | | | ... | ... |
| 111 | 01-30 | KSU | #13375 | 2" | CL. 150 | WAFER | 401-102 | CF8M | CF8M | 17-4PH | 10 | | | | | | | | | | ... | ... |
| 112 | 01-30 | KSU | #13375 | 2" | CL. 150 | WAFER | 401-102 | CF8M | CF8M | 17-4PH | 10 | | | | | | | | | | ... | ... |
| 113 | 01-30 | KSU | #13375 | 2" | CL. 150 | WAFER | 401-102 | CF8M | CF8M | 17-4PH | 10 | | | | | | | | | | ... | ... |
| 114 | 01-30 | KSU | #13375 | 2" | CL. 150 | WAFER | 401-105 | CF8M | CF8M | 17-4PH | 10 | | | | | | | | | | ... | ... |
| 115 | 01-30 | KSU | #13375 | 2" | CL. 150 | WAFER | 401-108 | CF8M | CF8M | 17-4PH | 10 | | | | | | | | | | ... | ... |

Legend: 1-ST COLOR, 2-ND COLOR, 3-RD COLOR, 4-TH COLOR, 5-TH COLOR

METHOD FOR MANAGING SEQUENTIAL PROCESSES BY USING SPREADSHEET-TYPE PROCESS DATA, PROCESS MANAGING SERVER AND SPECIFIC WORKER'S TERMINAL USING THE SAME

This application is a U.S. National Phase of KR 10-2019-0047588 filed on Apr. 23, 2019, the contents of which are incorporated herein by reference in entirety.

FIELD OF THE DISCLOSURE

The present disclosure relates to a method for managing sequential processes by using spreadsheet-type process data and a process managing server using the same.

BACKGROUND OF THE DISCLOSURE

With the advent of the era of the fourth industrial revolution thanks to the development of ICT, the construction of smart factories is being actively supported at the state level and the factories of large companies have already adopted smart factory systems to improve their production efficiency by automatically managing a variety of their events.

A representative case of a smart factory system is disclosed in Korean Patent registration No. 10-1929742 (Title of Invention: Smart Factory System, registered on Dec. 11, 2018; referred to as "the prior art document").

However, as the conventional factory management system such as the prior art document costed too much, it was difficult for small and medium-sized companies to adopt such a system.

Besides, because most of existing small and medium-sized companies still instruct work by using paper statements of work at their conventional factories, managers could not identify the current status of production in real time.

Furthermore, as it was difficult to measure manufacturing lead time, defect rates, etc. due to the limitation of the paper statements of work, it was also difficult to manage and improve processes in a detailed manner.

Accordingly, even for small and medium-sized companies which suffer aforementioned problems, there is a growing need to be managed equivalent to the smart factory system at lower costs than at costs of adopting the smart factory system.

SUMMARY OF THE DISCLOSURE

It is an object of the present disclosure to solve all problems explained above.

It is another object of the present disclosure to allow even small and medium-sized companies to be managed equivalent to a smart factory system at lower costs than at costs of adopting the smart factory system.

It is still another object of the present disclosure to identify current status of workers' performance and production in real time by implementing spreadsheet-type process tables serving as statements of work and enabling the workers to modify the process tables through the workers' terminals.

It is still yet another object of the present disclosure to shorten workers' waiting time for work by referring to current status of production identified in real time, improve a productivity index by process, and improve a manager's work efficiency.

It is still yet another object of the present disclosure to effectively manage required materials for product orders by counting the required materials depending on degrees of priority of the product orders, displaying areas of insufficient required materials for the product orders in a specific color, marking the quantities of the insufficient required materials, and transmitting them to a materials manager's terminal.

It is still yet another object of the present disclosure to allow individual workers to identify progress of products, processes of which they are in charge, by allowing the workers' terminals to display information on current processes that the individual workers have to perform and their corresponding previous processes.

It is still yet another object of the present disclosure to adopt machine-learning using images of a specific product produced through a specific process and cross-validate whether or not the quantity of the specific product produced through the specific process reach a predetermined order quantity.

In accordance with one aspect of the present disclosure, there is provided a method for managing processes by using spreadsheet-type process data, including steps of: (a) a process managing server, if spreadsheet-type process data including a list of product orders and information on sequential processes corresponding to the product orders, and current status data on materials are acquired, assigning degrees of priority to the individual product orders in the list of product orders and creating a process table that includes information on required materials corresponding to the individual product orders and the information on the sequential processes; and (b) the process managing server (i) transmitting the process table to a manager's terminal and workers' terminals, to thereby allow the manager's terminal and the workers' terminals to display the process table, (ii) allowing, if information on a selection of a specific product order to direct work is acquired from the manager's terminal, a specific process area in the process table corresponding to the specific product order to be displayed in a first color, (iii) allowing, if information on a selection of the specific process area to start work of the specific process is acquired from a terminal of a specific worker who performs the specific process, the color of the specific process area to be changed from the first color to a second one, and (iv) allowing, if information on a selection of the specific process area to finish the work of the specific process is acquired from the specific worker's terminal, the color of the specific process area to be changed from the second color to a third one.

As one example, the method further includes a step of: (c) the process managing server, after the specific process area has been allowed to be changed from the second color to the third one, allowing a subsequent process area in the process table corresponding to a subsequent process following the specific process to be displayed in the first color.

As one example, at the step of (a), the process managing server (i) counts the required materials for the individual product orders in the list of product orders depending on the degrees of priority of the individual product orders by referring to the current status data on the materials, (ii) allows an area of insufficient required materials among the information on the required materials to be displayed in a fourth color, (iii) allows the quantities of the insufficient required materials to be marked in the areas of insufficient required materials, and (iv) transmits them to a materials manager's terminal.

As one example, if updated current status data on the materials is acquired from the materials manager's terminal or the degrees of priority of the product orders are updated, the process managing server recounts the materials required for the individual product orders corresponding to the updated current status data on materials or the updated degrees of priority and updates the areas of the insufficient required materials and the quantities of the insufficient required materials by referring to the recounting result.

As one example, the process managing server assigns the degrees of priority by using at least one of closing dates, costs, and order quantities of the product orders and updates the degrees of priority by referring to changed locations of the product orders dragged and dropped in the process table at the manager's terminal to change their degrees of priority among the individual product orders.

As one example, at the step of (b), the process managing server transmits the process table to the workers' terminals to allow the workers' terminals to display the process table and allow information on current processes that individual workers corresponding to the individual workers' terminals have to perform and previous processes of the current processes to be displayed.

As one example, at the step of (b), on condition that the color of the specific process area has been changed from the first color to the second one, if information on one or more selections of the specific process area is acquired from the specific worker's terminal, the process managing server counts the number of the selections of the specific process area, and allows the color of the specific process area to be changed from the second color to the third one if the number of the selections of the specific process area corresponds to order quantity of the specific product order.

As one example, at the step of (b), on condition that the color of the specific process area has been changed from the first color to the second one, if information on a selection of the specific process area is not acquired from the specific worker's terminal during a preset period of time, the process managing server allows the color of the specific process area to be changed from the second color to a fifth color and transmits an alarm for it to the manager's terminal.

As one example, the process managing server supports the manager's terminal to perform voice communications with the specific worker's terminal by transmitting the alarm to the manager's terminal.

As one example, at the step of (b), on condition that the color of the specific process area has been changed from the first color to the second one, the process managing server counts the quantity of the specific product produced through the specific process by analyzing an image from an image sensor which captures a stage where the specific product is located and changes the specific process area from the second color to the third one if the quantity of the specific product corresponds to the order quantity of the specific product order.

In accordance with another aspect of the present disclosure, there is provided a method for managing processes by using spreadsheet-type process data, including steps of: (a) a specific worker's terminal corresponding to a specific process among workers' terminals corresponding to information on sequential processes, if (i) degrees of priority are assigned to the individual product orders by referring to spreadsheet-type process data including a list of product orders and the information on the sequential processes corresponding to individual product orders and current status data on materials by a process managing server and (ii) a process table that includes information on required materials corresponding to the individual product orders and the information on the sequential processes is acquired from the process managing server, displaying the process table to make the specific worker who performs the specific process perceive it; and (b) the specific worker's terminal, on condition that a specific process area of the specific process in the process table corresponding to a specific product order in response to directing work for the specific product order from the manager's terminal is displayed in a first color, (i) if the specific worker selects the specific process area to start work of the specific process, supporting the process managing server to change the specific process area in the process table from the first color to a second one by transmitting the selection to the process managing server, and (ii) if the specific worker selects the specific process area to finish the work of the specific process, supporting the process managing server to change the specific process area in the process table from the second color to a third one by transmitting the selection to the process managing server.

As one example, at the step of (b), on condition that the color of the specific process area has been changed from the first color to the second one, whenever the specific worker selects the specific process area to finish the work of the specific process, the specific worker's terminal transmits the selections of the specific process area to the process managing server to thereby support the process managing server to i) count the number of transmissions of the selections to the process managing server and ii) change the specific process area in the process table from the second color to the third one if the number of the transmissions of the selections to the process managing server corresponds to order quantity of the specific product order.

As one example, if materials required for the individual product orders in the list of product orders by referring to the current status data on materials are counted depending on the degrees of priority of the individual product orders, the specific worker's terminal supports the process managing server to display an area of insufficient required materials among the information on the required materials in a fourth color, to mark quantities of the insufficient required materials in the area of the insufficient required materials, and to transmit them to a materials manager's terminal.

In accordance with still another aspect of the present disclosure, there is provided a server for managing processes by using spreadsheet-type process data, including: at least one memory storing instructions; and at least one processor configured to execute the instructions; wherein, if spreadsheet-type process data including a list of product orders and information on sequential processes corresponding to the product orders, and current status data on materials are acquired, the processor performs processes of (1) assigning degrees of priority to the individual product orders in the list of product orders and creating a process table that includes information on required materials corresponding to the individual product orders and the information on the sequential processes and (2) (i) transmitting the process table to a manager's terminal and workers' terminals, to thereby allow the manager's terminal and the workers' terminals to display the process table, (ii) allowing, if information on a selection of a specific product order to direct work is acquired from the manager's terminal, a specific process area in the process table corresponding to the specific product order to be displayed in a first color, (iii) allowing, if information on a selection of the specific process area to start work of the specific process is acquired from a terminal of a specific worker who performs the specific process, the color of the specific process area to be changed from the first color to a second one, and (iv) allowing, if information on a selection of the specific process area to finish the work of the specific process is acquired from the specific worker's terminal, the color of the specific process area to be changed from the second color to a third one.

As one example, the processor further performs a process of allowing, after the specific process area has been allowed to be changed from the second color to the third one, a subsequent process area in the process table corresponding to a subsequent process following the specific process to be displayed in the first color.

As one example, at the process of (1), the processor (i) counts the required materials for the individual product orders in the list of product orders depending on the degrees of priority of the individual product orders by referring to the current status data on the materials, (ii) allows an area of insufficient required materials among the information on the required materials to be displayed in a fourth color, (iii) allows the quantities of the insufficient required materials to be displayed in the area of insufficient required materials, and (iv) transmits them to a materials manager's terminal.

As one example, if updated current status data on the materials is acquired from the materials manager's terminal or the degrees of priority of the product orders are updated, the processor recounts the materials required for the individual product orders corresponding to the updated current status data on materials or the updated degrees of priority and updates the areas of the insufficient required materials and the quantities of the insufficient required materials by referring to the recounting result.

As one example, the processor assigns the degrees of priority by using at least one of closing dates, costs, and order quantities of the product orders and updates the degrees of priority by referring to changed locations of the product orders dragged and dropped in the process table at the manager's terminal to change their degrees of priority among the individual product orders.

As one example, at the process of (2), the processor transmits the process table to the workers' terminals to allow the workers' terminals to display the process table and allow information on current processes that individual workers corresponding to the individual workers' terminals have to perform and previous processes of the current processes to be displayed.

As one example, at the process of (2), on condition that the color of the specific process area has been changed from the first color to the second one, if information on one or more selections of the specific process area is acquired from the specific worker's terminal, the processor counts the number of the selections of the specific process area, and allows the color of the specific process area to be changed from the second color to the third one if the number of the selections of the specific process area corresponds to order quantity of the specific product order.

As one example, at the process of (2), on condition that the color of the specific process area has been changed from the first color to the second one, if information on a selection of the specific process area is not acquired from the specific worker's terminal during a preset period of time, the processor allows the color of the specific process area to be changed from the second color to a fifth color and transmits an alarm for it to the manager's terminal.

As one example, the processor supports the manager's terminal to perform voice communications with the specific worker's terminal by transmitting the alarm to the manager's terminal.

As one example, at the process of (2), on condition that the color of the specific process area has been changed from the first color to the second one, the processor counts the quantity of the specific product produced through the specific process by analyzing an image from an image sensor which captures a stage where the specific product is located and changes the specific process area from the second color to the third one if the quantity of the specific product corresponds to the order quantity of the specific product order.

In accordance with still yet another aspect of the present disclosure, there is provided a specific worker's terminal for managing processes by using spreadsheet-type process data, including: at least one memory storing instructions; and at least one processor configured to execute the instructions; wherein, if (i) degrees of priority are assigned to the individual product orders by referring to spreadsheet-type process data including a list of product orders and the information on the sequential processes corresponding to individual product orders and current status data on materials by a process managing server and (ii) a process table that includes information on required materials corresponding to the individual product orders and the information on the sequential processes is acquired from the process managing server, the processor performs processes of (1) displaying the process table to make the specific worker who performs the specific process perceive it and (2) on condition that a specific process area of the specific process in the process table corresponding to a specific product order in response to directing work for the specific product order from the manager's terminal is displayed in a first color, (i) if the specific worker selects the specific process area to start work of the specific process, supporting the process managing server to change the specific process area in the process table from the first color to a second one by transmitting the selection to the process managing server, and (ii) if the specific worker selects the specific process area to finish the work of the specific process, supporting the process managing server to change the specific process area in the process table from the second color to a third one by transmitting the selection to the process managing server.

As one example, at the process of (2), on condition that the color of the specific process area has been changed from the first color to the second one, whenever the specific worker selects the specific process area to finish the work of the specific process, the processor transmits the selections of the specific process area to the process managing server to thereby support the process managing server to i) count the number of transmissions of the selections to the process managing server and ii) change the specific process area in the process table from the second color to the third one if the number of the transmissions of the selections to the process managing server corresponds to order quantity of the specific product order.

As one example, if materials required for the individual product orders in the list of product orders by referring to the current status data on materials are counted depending on the degrees of priority of the individual product orders, the processor supports the process managing server to display an area of insufficient required materials among the information on the required materials in a fourth color, to mark quantities of the insufficient required materials in the area of the insufficient required materials, and to transmit them to a materials manager's terminal.

BRIEF DESCRIPTION OF THE DRAWINGS

The above and other objects and features of the present disclosure will become apparent from the following description of preferred embodiments given in conjunction with the accompanying drawings, in which:

FIG. 2 is a schematic flowchart illustrating a method for managing processes by using process data in accordance with the present disclosure.

FIG. 3 is a schematic diagram showing a process table in accordance with the present disclosure.

DETAILED DESCRIPTION OF THE PREFERRED EMBODIMENTS

Figure 1:
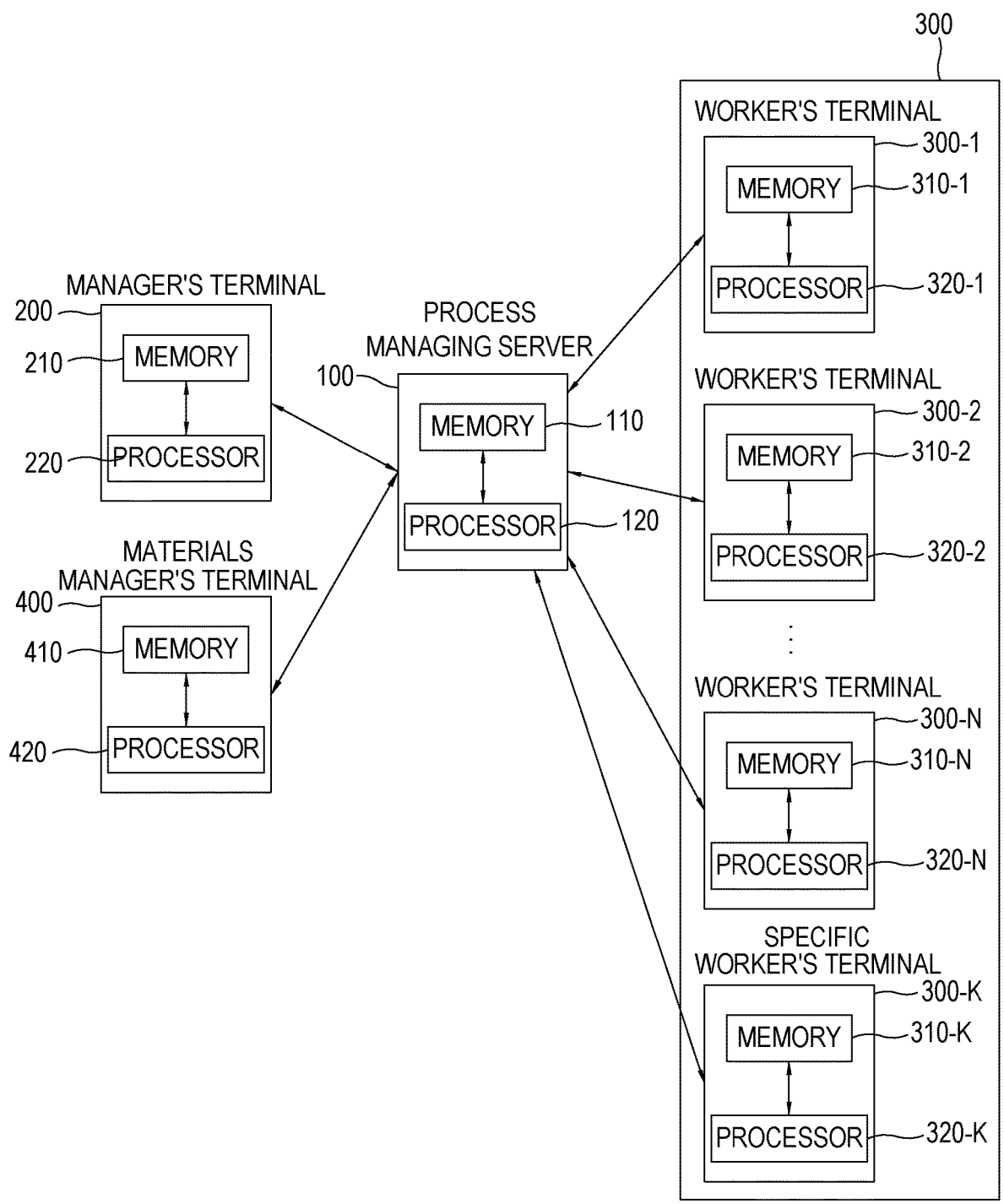
FIG. 1 is a schematic diagram illustrating a process managing server, a manager's terminal, a materials manager's terminal, and workers' terminals in accordance with the present disclosure.

Detailed explanations of the present disclosure explained below refer to attached drawings that illustrate specific embodiment examples of this present that may be executed. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like reference numerals designate the same or similar functionality throughout the several views.

The headings and abstract of the present disclosure provided herein are for convenience only and do not limit or interpret the scope or meaning of the embodiments.

To make it easy for those who have common knowledge in the art to which the present disclosure pertains to implement the present disclosure, detailed explanation on desirable embodiment examples of the present disclosure will be made by referring to attached drawings.

FIG. 1 schematically illustrates a process managing server 100, a manager's terminal 200, workers' terminals 300, and a materials manager's terminal 400 in accordance with the present disclosure.

The process managing server 100, the manager's terminal 200, the workers' terminals 300, and the materials manager's terminal 400 may have individual memories 110, 210, 310-1, 310-2, . . . , 310-n, and 410 and individual processors 120, 220, 320-1, 320-2, . . . , 320-n, and 420. Those who have ordinary skill in the arts could easily understand that the method of the present disclosure will be implemented by using a combination of computer hardware and software.

First of all, the individual memories 110, 210, 310-1, 310-2, . . . , 310-n, and 410 of the process managing server 100, the manager's terminal 200, the workers' terminals 300, and the materials manager's terminal 400 may store instructions. More specifically, the instructions, as computer software that allows the process managing server 100, the manager's terminal 200, the workers' terminals 300, and the materials manager's terminal 400 to be functioned in a particular manner, may be stored in a computer-available or computer-readable memory that can direct a computer or other programmable data processing apparatuses. The instructions may perform processes to execute functions illustrated in drawings.

Besides, the individual processors 120, 220, 320-1, 320-2, . . . , 320-n, and 420 of the process managing server 100, the manager's terminal 200, the workers' terminals 300, and the materials manager's terminal 400 may include hardware configuration such as a micro processing unit (MPU), a central processing unit (CPU), cache memory, data bus, etc. In addition, they may further include software configuration such as operating systems and applications for certain purposes.

As such, a method for managing processes by using spreadsheet-type process data with individual configurations of a process managing server 100, a manager's terminal 200, workers' terminals 300, and a materials manager's terminal 400 will be explained below by referring to FIGS. 2 and 3.

First, if spreadsheet-type process data including a list of product orders and information on sequential processes corresponding to the product orders, and current status data on materials are acquired at a step of S01, the process managing server 100 may assign degrees of priority to the individual product orders in the list of product orders and create a process table that includes information on required materials corresponding to the individual product orders and the information on the sequential processes at a step of S02.

Herein, examples of the product orders may be shown as each of product orders described in individual rows of a table in FIG. 3 and a list of the product orders corresponds to a set of the product orders. In addition, information on required materials may refer to types and the number of materials required to complete the individual product orders.

For example, it is assumed that there are one order of Product A and one order of Product B.

First, the process managing server 100 may acquire spreadsheet-type process data including information on sequential processes corresponding to the Products A and B and current status data on materials including materials corresponding to the Products A and B.

Moreover, the process managing server 100 may assign a first degree of priority to the order of the Product B and a second degree of priority to the order of the Product A, and create a process table that includes information on required materials corresponding to the respective orders of the Products A and B and the information on the sequential processes of the respective orders of the Products A and B.

Herein, because the order of the Product B takes the higher priority over the order of the Product A, a row in the process table where the order of the Product B is placed higher than that where the order of the Product A is placed but it is not limited to this. Of course, it may be described differently depending on product serial numbers, order dates, etc.

Moreover, as information on required materials corresponding to the order of the Product A, two pieces of material a, one piece of material b, and two pieces of material c may be marked in the process table and as information on required materials corresponding to the order of the Product B, one piece of the material a, one piece of the material b, and three pieces of the material c may be marked therein.

In addition, customers, sizes, delivery dates, etc. of the individual Products A and B may be displayed in the process table.

If the process table containing the aforementioned information is created, the process managing server 100 may transmit the process table to the manager's terminal 200 and the workers' terminals 300 to thereby allow the manager's terminal 200 and the workers' terminals 300 to display the process table and acquire one or more selections of a specific product order to direct work from the manager's terminal 200 at a step of S03.

For example, if the Product A goes through two processes: assembling and painting, on condition that individual terminals are given to a first worker who is in charge of the process of assembling the Product A and a second worker in charge of the process of painting the Product A; a manager's terminal 200 is given to a manager who supervises the processes; and a materials manager's terminal 400 is given to a materials manager; the manager's terminal 200, the materials manager's terminal 400, and the workers' terminals 300 may display the process table transmitted from the process managing server 100.

In addition, if information on a selection of a specific product order to direct work is acquired by the manager's terminal 200, the process managing server 100 may allow a specific process area corresponding to a specific process in the process table corresponding to the specific product order to be displayed in a first color at a step of S04.

For instance, on condition that (i) the Product B takes the higher degree of priority over the Product A, (ii) the Product B needs to go through three processes: turning, boring, and drilling the Product B in the order thereof, and (iii) the process of turning the Product B has been finished; if the manager selects an order of the Product B to direct work of boring the Product B, the manager's terminal 200 may transmit information on the selection of the order of the Product B to the process managing server 100. Herein, before the manager's terminal 200 transmits the information on the selection of the specific product order to the process managing server 100 to direct work, a manager authentication process for checking the identity of the manager may be additionally carried out. Such authentication process may prevent a third person from directing work without authorization, keep records on who has directed which work, and give an opportunity to supplement any wrong work direction.

Furthermore, the process managing server 100 may allow the boring process area corresponding to the order of the Product B in the process table to be displayed in a first color, respectively, in the manager's terminal 200 and the workers' terminals 300.

Herein, the boring process area corresponding to the order of the Product B in the process table is displayed in the first color not only to the manager's terminal 200 and the workers' terminals 300. For example, the boring process area of the order of the Product B may be displayed in the first color also in the materials manager's terminal 400.

However, the specific process area may be displayed in the first color even if the information on the selection of the specific product order to direct work is not acquired from the manager's terminal 200. For example, on assumption that (i) the order of the Product B takes the higher degree of priority over the order of the Product A, (ii) it needs to go through three processes of turning, boring, and drilling the Product B in the order thereof, and (iii) the process of turning the Product B has been finished, even if the manger does not direct work to start boring the Product B, the process managing server 100 may allow the boring process area of the order of the Product B to be automatically displayed in the first color, depending on certain conditions such as time, process status, etc.

Besides, if information on a selection of the specific process area to start work of the specific process is acquired from the specific worker's terminal 300-K corresponding to the specific worker who performs the specific process, the specific process area may be allowed to be changed from the first color to a second one at a step of S05 and if information on a selection of the specific process area to finish work of the specific process is acquired from the specific worker's terminal 300-K, the specific process area may be allowed to be changed from the second color to a third one at a step of S06.

More specifically, after the boring process area corresponding to the order of the Product B has been displayed in the first color to direct work, the terminal given to the worker in charge of the process of boring the Product B may transmit the information on the selection of the boring process area to start the work of boring the Product B to the process managing server 100. As such, if the information on the selection of the boring process area to start the work of boring the Product B is acquired, the process managing server 100 may allow the boring process area corresponding to the order of the Product B to be changed from the first color to the second to thereby allow the information that the worker in charge has started the process of boring the Product B to be displayed in the manager's terminal 200, the workers' terminals 300, etc.

In addition, to deliver information that the worker in charge of the process of boring the Product B has finished the boring process, the worker's terminal may transmit information on a selection of the boring process area. As such, if the information that the process of boring the Product B has been finished is acquired, the process managing server 100 may allow the boring process area of the order of the Product B to be changed from the second color to a third one to thereby allow information that the worker in charge has finished the process of boring the Product B to be displayed in the manager's terminal 200, the workers' terminals 300, etc.

The aforementioned processes may allow the manager to identify the progress of the specific process of the specific product order through the manager's terminal 200 even though the manager does not directly visit the specific process site.

Meanwhile, before the specific worker's terminal 300-K transmits information on individual selections of the specific process area to start and finish the specific process, respectively, to the process managing server 100, an authentication process for checking the identity of the specific worker who is in charge of the specific process may be conducted. Such authentication process may prevent a third person from transmitting work starting and finishing report without authorization, keep records on who has performed which work, and give an opportunity to prevent a situation that the specific worker transmits wrong information.

Furthermore, even if the specific worker's terminal 300-K transmits information on selections of the specific process area to start and finish the work of the specific process, respectively, to the process managing server 100, the aforementioned authentication process may prevent the specific process area from being immediately changed to the second or third color but may allow the color of the specific process area to be changed to the second or third one only through the manager's authentication process. If the manager does not respond for a certain period of time, it would be possible to automatically give a call or text message to the manager's mobile terminal or to make the mobile terminal ring an alarm.

By the way, because there may be multiple processes of the specific product, the process managing server 100 may allow the color of the specific process area to be changed from the second color to the third one before allowing a sequential process area in the process table corresponding to the sequential process of the specific process to be displayed in the first color.

In other words, on assumption that the order of the Product B is completed through the processes of turning, boring, and drilling, after the boring process area has been changed from the second color to the third one due to the finished process of boring the Product B, the process managing server 100 may allow the drilling process area corresponding to the drilling process next to the boring process to be displayed in the first color to thereby direct the work to the worker.

The process managing server 100 may count materials required for the individual product orders in the list of product orders depending on the degrees of priority of the individual product orders by referring to the current status data on the materials, allow areas of one or more insufficient required materials among the information on the required materials to be displayed in a fourth color, allow the quantity of the one or more insufficient required materials to be marked in the areas of the one or more insufficient required materials, and transmit them to the materials manager's terminal 400.

For example, on assumption that one piece of material a, one piece of material b, and three pieces of material c are required to finish the Product B, the process managing server 100 may count required materials for products with higher degrees of priority and similarly those for the Product B.

Herein, as a result of counting the required materials for the products which have the higher degrees of priority than the Product B, if any of the required materials for the Product B is insufficient (for example, if one piece of the material a, one piece of the material b, and one piece of the material c are left, the material c for the Product B is insufficient since two pieces of the material c is required to make the Product B), the process managing server 100 may allow the area of the material c in the process table corresponding to the order of the Product B to be displayed in a fourth color and allow "two" as the number of the pieces of the required material to be marked in the area of the material c. However, it is not limited to the aforementioned case. It would be possible to display the area of the material c in the process table corresponding to the order of the Product B in the fourth color and mark "one" as the currently remaining pieces in the area of the material c.

In addition, the process managing server 100 may transmit the quantities of the insufficient required materials to finish the Product B to the materials manager's terminal 400. This may enable the materials manger to recognize the quantity of the insufficient material c to prevent hindrance in the progress of the process by securing the material c for the Product B while the work for other products is being conducted according to the degrees of priority.

Meanwhile, if the updated current status data on materials is acquired from the materials manager's terminal 400 or the degrees of priority of product orders are updated, the process managing server 100 may recount the materials required for the individual product orders corresponding to the updated current status data on materials or the updated degrees of priority and update the areas of the insufficient required materials and the quantities of the insufficient required materials by referring to the recounting result.

However, even though the degrees of priority of the product orders have been updated as shown above, the progress of processes may be kept as the existing progress.

For example, if information on the insufficient required material c for the Product B was transmitted to the materials manager's terminal 400 and then the quantity of the material c has been fully secured, the secured quantity of the material c may be reflected to thereby allow the current status data on materials to be updated.

In addition, when acquiring the updated current status data on materials, the process managing server 100 may recount the required materials depending on the degrees of priority according to the changed current status of the materials.

In short, as the material c has been secured, the material c for the order of the Product B is not an insufficient required material any more. By referring to the recounting result, the areas and the quantity of insufficient required materials may be updated.

Besides, the process managing server 100 may prevent the area of the material c for the order of the Product B from being displayed in the fourth color any more in the manager's terminal 200, the workers' terminals 300, etc.

Meanwhile, if there have been two pieces of the insufficient required material c for the order of the Product B and only one piece is additionally secured, the fourth color would be displayed in the area of the material c for the order of the Product B yet, but the quantity of the insufficient required material c may be marked from two to one according to the updated current status data on materials.

Furthermore, even if the material is not additionally secured, if the degrees of priority of individual product orders have been changed, the areas and quantities of insufficient required materials may be updated.

For example, even though one piece of the material b for the order of the Product A with the lower degree of priority was insufficient, if the degree of priority of the order of the Product A is changed to be higher, the material for the order of the Product A becomes preferentially counted. Therefore, the material b for the order of the Product A may not be an insufficient required material any longer and the process managing server 100 may prevent the area corresponding to the material b for the order of the Product A from being displayed in the fourth color.

Besides, the process managing server 100 may assign degrees of priority to product orders by using at least one of closing dates, costs, and order quantities of product orders and update the degrees of priority by referring to changed locations of the product orders dragged and dropped in the process table at the manager's terminal 200 to change their degrees of priority among the product orders.

For example, the process managing server 100 may assign degrees of priority to product orders to preferentially complete some product orders whose net profit is largest. However, it is not limited to this. As part of other examples, the process managing server 100 may also assign the degrees of priority to another some product orders which take a lot of time to finish work among the product orders.

Meanwhile, if the manager intends to change the degrees of priority of the product orders, the manager may drag and drop some product orders to change the locations of said some product orders of which degrees of priority the manager wants to change in the process table. As such, if the locations of said some product orders with the changed degrees of priority are changed, the process managing server 100 may update the degrees of priority of said some product orders by referring to the changed locations.

Besides, the process managing server 100 may transmit the process table to the workers' terminals 300 to thereby allow the workers' terminals 300 to display the process table and display information on current processes that individual workers corresponding to the individual workers' terminals have to perform and their corresponding previous processes.

In brief, the process managing server 100 may allow the workers' terminals 300 to display information on the individual processes of which the individual workers are in charge and also information on previous processes of current processes of which the individual workers are in charge.

Through this, the individual workers may see the progress of their previous processes respectively and be ready for starting work not only when they are directed to start the work of the current processes but also before they are done.

Besides, on condition that the color of the specific process area has been changed from the first color to the second one, if information on one or more selections of the specific process area is acquired from the specific worker's terminal 300-K, the process managing server 100 may count the number of the selections of the specific process area, and if the number of the selections of the specific process area corresponds to a predetermined order quantity of the specific product order, it may allow the color of the specific process area to be changed from the second color to the third one.

For example, if an order of Product C is a request for supplying 10 units of the Product C, the turning process may be repeated 10 times to produce 10 units of the Product C. Accordingly, on condition that the turning process area of the order of the Product C has been changed to the second color through the acquisition of information on the selections of the turning process to start the turning process from the worker's terminal, the turning process area would not be changed to the third color until the selections of the turning process area are made 10 times to allow the worker to finish the turning process.

This may prevent the manager's terminal 200 from directing work whenever the turning process is finished and stop the terminal of the worker in charge from transmitting each selection of the turning process area to start the work whenever the turning process is repeated.

In addition, on condition that the color of the specific process area has been changed from the first color to the second one, if information on a selection of the specific process area is not acquired from the specific worker's terminal 300-K during a preset period of time, the process managing server 100 may allow the color of the specific process area to be changed from the second color to a fifth one and transmit an alarm for it to the manager's terminal 200.

For instance, on condition that the color of the specific process area has been changed to the second color because the specific worker started the specific process, if information on a selection of the specific process area is not acquired during a preset period of time, it could be seen that there occurs a problem in the specific process.

However, because there may be multiple processes that the manager has to check, it could be difficult to take an immediate action by recognizing the aforementioned situation. Accordingly, if information on a selection of the specific process area is not acquired during a preset period of time, the process managing server 100 may allow the color of the specific process area to be changed from the second color to the fifth one and transmit an alarm for it to the manager's terminal 200 to thereby take an immediate action on the problem occurring in the specific process.

In addition to this, the process managing server 100 may support the manager's terminal 200 to perform voice communications with the specific worker's terminal 300-K by transmitting an alarm to the manager's terminal 200.

By referring to FIG. 3, an example of a method for displaying colors in a process table will be explained.

Given nos. 107 and 108 orders on the first row, as work of all processes of turning, boring, and drilling a body has been finished, it can be found that the third color which is black is displayed.

In addition, given no. 109 order, it can be found that as work of all processes of turning and boring the body has been finished, the areas are displayed in black, but because information on a selection of a drilling process area to start work of the drilling process was not acquired from the specific worker's terminal during a preset period of time, the worker's cell in the drilling process area has been changed from green as the second color to red as the fifth one.

Furthermore, given no. 110 order, it can be found that as work of the processes of turning and boring the body has been finished, the areas are displayed in black, and as information on a selection of the drilling process area to start work of the drilling process was acquired from the specific worker's terminal corresponding to a worker who performs the drilling process during a preset period of time, the worker's cell in the drilling process area has been changed from yellow as the first color to green as the second one.

In addition, given no. 111 order, it can be found that as work of the process of turning the body has been finished, the area is displayed in black, and as information on a selection to direct work of the boring process from the manager's terminal was acquired, the worker's cell in the boring process area is displayed in yellow as the first color.

Moreover, given nos. 112 and 113 orders, it can be found that as a selection to direct work of the process of turning the body is acquired, the turning process area is displayed in yellow as the first color. However, in case of nos. 112 and 113 orders, it can be found that due to the lack of a material which is a stem, the areas of the material are displayed in magenta as the fourth color.

Besides, given nos. 114 and 115 orders, it can be found that now due to the lack of all the materials which are the body, the disc, and the stem, the areas of the materials are displayed in magenta as the fourth color. As for the orders, as it is impossible to perform the processes due to the lack of all the materials, it can be found that selections to direct work cannot be acquired from the manager's terminal and therefore, the areas of all processes are displayed in white.

Meanwhile, on condition that the color of the specific process area has been changed from the first color to the second one, the process managing server 100 may count the quantity of the specific product by analyzing an image from an image sensor which captures a stage where the specific product is located and may change the color of the specific process area from the second color to the third one if the quantity of the specific product corresponds to the order quantity of the specific product order. As another example, the process managing server 100 may allow a separate image analyzer to analyze an image of the stage where the specific product is located to count the quantity of the specific product and transmit the counting result to the process managing server 100.

For example, the process managing server 100 may allow a separate image analyzer to learn images of the specific product (e.g., semi-finished product, or finished product) produced through the specific process. Besides, it can be found that whether or not the specific product has been produced and how many units of the specific product have been produced, etc. by learning and analyzing the images of the stage where the specific product is located through a certain apparatus using a convolutional neural network (CNN).

More specifically, even though the specific worker's terminal 300-K does not transmit a selection of the specific process area to finish work of the specific process to the process managing server 100, it can be found that the certain apparatus analyzes the images of the semi-finished product or the finished product produced through the specific process to check whether the specific process has been finished or not. Through this, whenever the specific process is finished, even though the specific worker does not operate the specific worker's terminal, the process managing server 100 may allow the color of the specific process area to be changed from the second color to the third one.

Moreover, the certain apparatus may analyze the image of the semi-finished product or the finished product produced through the specific process to check a product defect by appearance.

Furthermore, if there are multiple products produced through the specific process, the certain apparatus may analyze images which capture the multiple products through image segmentation and check how many products have been through the specific process in the images, whether the order quantity has been filled, and a product defect by appearance.

Accordingly, if the quantity of the specific product corresponds to the order quantity of the specific product order, it means that the mission of the specific product order has been completed, the process managing server 100 may allow the color of the specific process area to be changed from the second color to the third one to prevent the workers from continuously producing the specific product.

Herein, a course of counting the quantity of the specific product going through the specific process by using the CNN or determining defects may be explained as shown below:

First of all, if an image is acquired from the image sensor that captures the stage where the specific product is located using a CNN-based object detector, the process managing server 100 or the image analyzer may input the image to a convolutional layer and allow the convolutional layer to perform convolution on the image to thereby output a feature map corresponding to the image. Besides, it may also allow it to acquire a region of interest (ROI) proposal by passing the feature map through a regional proposal network (RPN) and resize pixel data included in a region of the feature map corresponding to the ROI proposal using a pooling layer by applying either of max pooling or average pooling. After that, a feature vector is outputted by referring to the resized feature map. After that, the specific product located in the image may be detected through the CNN operation by inputting the feature vector in the fully connected (FC) layer. Besides, it would be possible to determine whether or not the specific product through the specific process was located at the stage by referring to the result from the FC layer and count the quantity of the specific product produced through the specific process according to continuous operations. Furthermore, it would be possible to determine whether the specific product produced through the specific process is defective or not based on the information corresponding to the specific product detected in the image. Herein, the CNN-based object detector may have acquired losses by referring to various output values and their corresponding ground truth (GT) values from the FC layer and have been trained in advance through back propagation using the acquired losses.

In addition, if the CNN-based segmentation is used, and an image is acquired through the image sensor that captures the stage where the specific product is located, the process managing server 100 or the image analyzer acquires the feature map by performing several convolution operations on the image with the CNN-based multiple convolutional layers and acquires a label image by performing several deconvolution operations on the feature map with CNN-based multiple deconvolutional layers. Besides, it would be possible to determine whether the specific product produced through the specific process has been located at the stage by referring to the image segmented from the label image and count the quantity of the specific product produced through the specific process according to continuous operations. Moreover, it would be possible to determine whether the specific product produced through the specific process is defective or not based on information corresponding to the specific product in the segmented image. Herein, the CNN-based segmentation may have acquired losses by referring to various label images and their corresponding GT values and have been trained in advance through the backpropagation using the acquired losses.

Meanwhile, in order to prevent the worker from selecting the specific process area by mistake in case the previous process of the specific process has not been finished or work of the specific process has not been directed, the process managing server 100 may prevent the worker's terminal from transmitting a selection of the specific process area to start the work of the specific process.

However, the specific product order may have one row in the process table but it is not limited to this. If there are multiple order quantities of the specific product included in the specific product order, as many rows as the order quantities may be in the process table.

For example, if ten units of the Product A are requested by the order of the Product A, one specific worker may finish all of them, but, as another example, each of 10 workers may finish each unit. As such, when each of 10 workers shares each of units, each of the workers should acquire information on selections corresponding to directing, starting, and finishing work. Therefore, the product order may have each of rows corresponding to each of the workers.

In addition, the manager's terminal 200, which separates from the materials manager's terminal 400, is illustrated in the drawings, but it is not limited to this. The manager's terminal 200 and the materials manager's terminal 400 may be included in one apparatus as well.

The present disclosure has the following effects:

The present disclosure has an effect of allowing small and medium-sized companies to get management equivalent to smart factory systems at much lower costs than the costs of adopting the smart factory systems.

In addition, the present disclosure has another effect of identifying the current status of workers' performance and production in real time by implementing a spreadsheet-type process table as a statement of work and allowing the workers to modify the process table through their terminals.

Furthermore, the present disclosure has still another effect of shortening workers' waiting time for work, improving a productivity index by process, and improving a manager's work efficiency by referring to the current status of production identified in real time.

Besides, the present disclosure has still yet another effect of counting materials required for the individual product orders according to the degrees of priority of the product orders, displaying areas of the insufficient required materials for the product orders in a specific color and the quantities of the insufficient required materials, and transmitting them to the materials manager's terminal to thereby manage the required materials per product effectively.

In addition, the present disclosure has still yet another effect of allowing workers' terminals to display information on the current processes that the individual workers have to perform and the previous processes of the current processes to thereby allow the progress of the products for the processes that the individual workers are in charge of to be perceived.

Furthermore, the present disclosure has still yet another effect of using machine-learning for an image of the specific product produced through the specific process and cross-validating whether or not the quantity of the specific product produced through the specific process reaches the predetermined order quantity.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. While the present disclosure has been shown and described with respect to the preferred embodiments, it, however, will be understood by those skilled in the art that various changes and modification may be made without departing from the spirit and scope of the present disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for managing processes by using spreadsheet-type process data, comprising steps of:
(a) a process managing server, if spreadsheet-type process data including a list of product orders and information on sequential processes corresponding to the product orders, and current status data on materials are acquired, assigning degrees of priority to the individual product orders in the list of product orders and creating a process table that includes information on required materials corresponding to the individual product orders and the information on the sequential processes; and
(b) the process managing server (i) transmitting the process table to a manager's terminal and workers' terminals, to thereby allow the manager's terminal and the workers' terminals to display the process table, (ii) allowing, if information on a selection of a specific product order to direct work is acquired from the manager's terminal, a specific process area in the process table corresponding to the specific product order to be displayed in a first color, (iii) allowing, if information on a selection of the specific process area to start work of the specific process is acquired from a terminal of a specific worker who performs the specific process, the color of the specific process area to be changed from the first color to a second one, and (iv) allowing, if information on a selection of the specific process area to finish the work of the specific process is acquired from the specific worker's terminal, the color of the specific process area to be changed from the second color to a third one; and
(c) using machine-learning for an image of the specific product produced through the specific process and cross-validating the quantity of the specific product produced through the specific process.

2. The method of claim 1, further comprising a step of:
(d) the process managing server, after the specific process area has been allowed to be changed from the second color to the third one, allowing a subsequent process area in the process table corresponding to a subsequent process following the specific process to be displayed in the first color.

3. The method of claim 1, wherein, at the step of (a), the process managing server (i) counts the required materials for the individual product orders in the list of product orders depending on the degrees of priority of the individual product orders by referring to the current status data on the materials, (ii) allows an area of insufficient required materials among the information on the required materials to be displayed in a fourth color, (iii) allows the quantities of the insufficient required materials to be marked in the areas of insufficient required materials, and (iv) transmits them to a materials manager's terminal.

4. The method of claim 3, wherein, if updated current status data on the materials is acquired from the materials manager's terminal or the degrees of priority of the product orders are updated, the process managing server recounts the materials required for the individual product orders corresponding to the updated current status data on materials or the updated degrees of priority and updates the areas of the insufficient required materials and the quantities of the insufficient required materials by referring to the recounting result.

5. The method of claim 1, wherein the process managing server assigns the degrees of priority by using at least one of closing dates, costs, and order quantities of the product orders and updates the degrees of priority by referring to changed locations of the product orders dragged and dropped in the process table at the manager's terminal to change their degrees of priority among the individual product orders.

6. The method of claim 1, wherein, at the step of (b), the process managing server transmits the process table to the workers' terminals to allow the workers' terminals to display the process table and allow information on current processes that individual workers corresponding to the individual workers' terminals have to perform and previous processes of the current processes to be displayed.

7. The method of claim 1, wherein, at the step of (b), on condition that the color of the specific process area has been changed from the first color to the second one, if information on one or more selections of the specific process area is acquired from the specific worker's terminal, the process managing server counts the number of the selections of the specific process area, and allows the color of the specific process area to be changed from the second color to the third one if the number of the selections of the specific process area corresponds to order quantity of the specific product order.

8. The method of claim 1, wherein, at the step of (b), on condition that the color of the specific process area has been changed from the first color to the second one, if information on a selection of the specific process area is not acquired from the specific worker's terminal during a preset period of time, the process managing server allows the color of the specific process area to be changed from the second color to a fifth color and transmits an alarm for it to the manager's terminal.

9. The method of claim 8, wherein the process managing server supports the manager's terminal to perform voice communications with the specific worker's terminal by transmitting the alarm to the manager's terminal.

10. The method of claim 1, wherein, at the step of (b), on condition that the color of the specific process area has been changed from the first color to the second one, the process managing server counts the quantity of the specific product produced through the specific process by analyzing an image from an image sensor which captures a stage where the specific product is located and changes the specific process area from the second color to the third one if the quantity of the specific product corresponds to the order quantity of the specific product order.

11. A method for managing processes by using spreadsheet-type process data, comprising steps of:
(a) a specific worker's terminal corresponding to a specific process among workers' terminals corresponding to information on sequential processes, if (i) degrees of priority are assigned to the individual product orders by referring to spreadsheet-type process data including a list of product orders and the information on the sequential processes corresponding to individual product orders and current status data on materials by a process managing server and (ii) a process table that includes information on required materials corresponding to the individual product orders and the information on the sequential processes is acquired from the process managing server, displaying the process table to make the specific worker who performs the specific process perceive it; and
(b) the specific worker's terminal, on condition that a specific process area of the specific process in the process table corresponding to a specific product order in response to directing work for the specific product order from the manager's terminal is displayed in a first color, (i) if the specific worker selects the specific process area to start work of the specific process, supporting the process managing server to change the specific process area in the process table from the first color to a second one by transmitting the selection to the process managing server, and (ii) if the specific worker selects the specific process area to finish the work of the specific process, supporting the process managing server to change the specific process area in the process table from the second color to a third one by transmitting the selection to the process managing server; and
(c) using machine-learning for an image of the specific product produced through the specific process and cross-validating the quantity of the specific product produced through the specific process reaches the predetermined order quantity.

12. The method of claim 11, wherein, at the step of (b), on condition that the color of the specific process area has been changed from the first color to the second one, whenever the specific worker selects the specific process area to finish the work of the specific process, the specific worker's terminal transmits the selections of the specific process area to the process managing server to thereby support the process managing server to i) count the number of transmissions of the selections to the process managing server and ii) change the specific process area in the process table from the second color to the third one if the number of the transmissions of the selections to the process managing server corresponds to order quantity of the specific product order.

13. The method of claim 11, wherein, if materials required for the individual product orders in the list of product orders by referring to the current status data on materials are counted depending on the degrees of priority of the individual product orders, the specific worker's terminal supports the process managing server to display an area of insufficient required materials among the information on the required materials in a fourth color, to mark quantities of the insufficient required materials in the area of the insufficient required materials, and to transmit them to a materials manager's terminal.

14. A server for managing processes by using spreadsheet-type process data, comprising:
at least one memory storing instructions; and
at least one processor configured to execute the instructions;
wherein, if spreadsheet-type process data including a list of product orders and information on sequential processes corresponding to the product orders, and current status data on materials are acquired, the processor performs processes of (1) assigning degrees of priority to the individual product orders in the list of product orders and creating a process table that includes information on required materials corresponding to the individual product orders and the information on the sequential processes and (2) (i) transmitting the process table to a manager's terminal and workers' terminals, to thereby allow the manager's terminal and the workers' terminals to display the process table, (ii) allowing, if information on a selection of a specific product order to direct work is acquired from the manager's terminal, a specific process area in the process table corresponding to the specific product order to be displayed in a first color, (iii) allowing, if information on a selection of the specific process area to start work of the specific process is acquired from a terminal of a specific worker who performs the specific process, the color of the specific process area to be changed from the first color to a second one, and (iv) allowing, if information on a selection of the specific process area to finish the work of the specific process is acquired from the specific worker's terminal, the color of the specific process area to be changed from the second color to a third one;
further wherein, machine-learning is used for an image of the specific product produced through the specific process and is cross-validated to determine when the quantity of the specific product produced through the specific process reaches the predetermined order quantity.

15. The server of claim 14, wherein the processor further performs a process of allowing, after the specific process area has been allowed to be changed from the second color to the third one, a subsequent process area in the process table corresponding to a subsequent process following the specific process to be displayed in the first color.

16. The server of claim 14, wherein, at the process of (1), the processor (i) counts the required materials for the individual product orders in the list of product orders depending on the degrees of priority of the individual product orders by referring to the current status data on the materials, (ii) allows an area of insufficient required materials among the information on the required materials to be displayed in a fourth color, (iii) allows the quantities of the insufficient required materials to be displayed in the area of insufficient required materials, and (iv) transmits them to a materials manager's terminal.

17. The server of claim 16, wherein, if updated current status data on the materials is acquired from the materials manager's terminal or the degrees of priority of the product orders are updated, the processor recounts the materials required for the individual product orders corresponding to the updated current status data on materials or the updated degrees of priority and updates the areas of the insufficient required materials and the quantities of the insufficient required materials by referring to the recounting result.

18. The server of claim 14, wherein the processor assigns the degrees of priority by using at least one of closing dates, costs, and order quantities of the product orders and updates the degrees of priority by referring to changed locations of the product orders dragged and dropped in the process table at the manager's terminal to change their degrees of priority among the individual product orders.

19. The server of claim 14, wherein, at the process of (2), the processor transmits the process table to the workers' terminals to allow the workers' terminals to display the process table and allow information on current processes that individual workers corresponding to the individual workers' terminals have to perform and previous processes of the current processes to be displayed.

20. The server of claim 14, wherein, at the process of (2), on condition that the color of the specific process area has been changed from the first color to the second one, if information on one or more selections of the specific process area is acquired from the specific worker's terminal, the processor counts the number of the selections of the specific process area, and allows the color of the specific process area to be changed from the second color to the third one if the number of the selections of the specific process area corresponds to order quantity of the specific product order.

21. The server of claim 14, wherein, at the process of (2), on condition that the color of the specific process area has been changed from the first color to the second one, if information on a selection of the specific process area is not acquired from the specific worker's terminal during a preset period of time, the processor allows the color of the specific process area to be changed from the second color to a fifth color and transmits an alarm for it to the manager's terminal.

22. The server of claim 21, wherein the processor supports the manager's terminal to perform voice communications with the specific worker's terminal by transmitting the alarm to the manager's terminal.

23. The server of claim 14, wherein, at the process of (2), on condition that the color of the specific process area has been changed from the first color to the second one, the processor counts the quantity of the specific product produced through the specific process by analyzing an image from an image sensor which captures a stage where the specific product is located and changes the specific process area from the second color to the third one if the quantity of the specific product corresponds to the order quantity of the specific product order.

24. A specific worker's terminal for managing processes by using spreadsheet-type process data, comprising:
at least one memory storing instructions; and
at least one processor configured to execute the instructions;
wherein, if (i) degrees of priority are assigned to the individual product orders by referring to spreadsheet-type process data including a list of product orders and the information on the sequential processes corresponding to individual product orders and current status data on materials by a process managing server and (ii) a process table that includes information on required materials corresponding to the individual product orders and the information on the sequential processes is acquired from the process managing server, the processor performs processes of (1) displaying the process table to make the specific worker who performs the specific process perceive it and (2) on condition that a specific process area of the specific process in the process table corresponding to a specific product order in response to directing work for the specific product order from the manager's terminal is displayed in a first color, (i) if the specific worker selects the specific process area to start work of the specific process, supporting the process managing server to change the specific process area in the process table from the first color to a second one by transmitting the selection to the process managing server, and (ii) if the specific worker selects the specific process area to finish the work of the specific process, supporting the process managing server to change the specific process area in the process table from the second color to a third one by transmitting the selection to the process managing server;
further wherein, machine-learning is used for an image of the specific product produced through the specific process and is cross-validated to determine when the quantity of the specific product produced through the specific process reaches the predetermined order quantity.

25. The terminal of claim 24, wherein, at the process of (2), on condition that the color of the specific process area has been changed from the first color to the second one, whenever the specific worker selects the specific process area to finish the work of the specific process, the processor transmits the selections of the specific process area to the process managing server to thereby support the process managing server to i) count the number of transmissions of the selections to the process managing server and ii) change the specific process area in the process table from the second color to the third one if the number of the transmissions of the selections to the process managing server corresponds to order quantity of the specific product order.

26. The terminal of claim 24, wherein, if materials required for the individual product orders in the list of product orders by referring to the current status data on materials are counted depending on the degrees of priority of the individual product orders, the processor supports the process managing server to display an area of insufficient required materials among the information on the required materials in a fourth color, to mark quantities of the insufficient required materials in the area of the insufficient required materials, and to transmit them to a materials manager's terminal.

\* \* \* \* \*